United States Patent Office.

EPHRAIM IVETT AND ALEXANDER GEORGE, OF CLAY BANK, OHIO.

COMPOUND FOR REPAIRING STOVES, FIRE-BRICKS, &c.

SPECIFICATION forming part of Letters Patent No. 314,182, dated March 17, 1885.

Application filed June 12, 1884. (No specimens.)

*To all whom it may concern:*

Be it known that we, EPHRAIM IVETT and ALEXANDER GEORGE, citizens of the United States, and residents of Clay Bank, in the county of Perry and State of Ohio, have invented certain new and useful Improvements in Compounds for Repairing Stoves, Fire-Bricks, &c.; and we do hereby declare that the following is a full, clear, and exact description of the invention, which will enable others skilled in the art to which it appertains to make and use the same.

This invention relates to an improved compound for filling cracks and holes in stoves and grates, and for retaining and relining back walls in stoves and grates, and for constructing fire-bricks and linings for stoves and the like.

Our invention consists of the following ingredients in about the annexed proportions, namely: fire-clay burned and ground fine, twelve pounds; fire-clay unburned and ground fine, four pounds; sifted wood-ashes, one pound; fine sand, four pounds; salt, four pounds; black-lead, one pound; asphaltum, one pound. These ingredients are to be thoroughly mingled by agitation, a sufficient quantity of water being added to form a plastic mass of the proper consistency—that is, of such a nature that it may be easily forced into cracks or openings of stoves and the like, and be retained there by its natural adhesion.

The method of applying this compound for the repairs of stoves and the like as well as the fire-bricks or back walls of the same will be readily understood from the foregoing. It is obvious that any suitable tools may be employed for forcing it into the desired position.

The heat of the fires in the stoves or grates to which it is applied will in a short time serve to harden the compound to such an extent that its presence can hardly be detected.

If desired, our improved compound may, while in its plastic state, be molded into suitable shapes for fire-bricks and the like, and after thus being molded it may be burned in suitable kilns.

Fire-bricks and linings constructed of this compound will be found durable and not easily affected by even the strongest and hottest fires.

Having thus described our invention, we claim and desire to secure by Letters Patent of the United States—

1. An improved plastic compound for repairing stoves, fire-bricks, and the like, the same consisting of burned and ground fire-clay, unburned and ground fire-clay, sifted wood-ashes, sand, salt, black-lead, asphaltum, and water in about the proportions herein set forth.

2. A fire-brick or similar article composed of the following ingredients in about the annexed proportions, namely: burned and ground fire-clay, unburned and ground fire-clay, sifted wood-ashes, sand, salt, black-lead, asphaltum, and water, the said ingredients being mixed, molded, and burned, substantially as and for the purpose set forth.

In testimony that we claim the forgoing as our own we have hereunto affixed our signatures in presence of two witnesses.

EPHRAIM IVETT.
ALEXANDER GEORGE.

Witnesses:
P. BRUMAGE,
M. A. CROSBIE.